# 3,121,722
PROCESS FOR PREPARING N-ALKYL AND N-HYDROXYALKYL DERIVATIVES OF l-EMETINE

Alexander Crawford Ritchie, Harrow, Dennis Edward Clark, Chalfont St. Peter, Thomas Walker, Wembley, and Keith Desmond Eric Whiting, Brookmans Park, England, assignors to Glaxo Group Limited, Greenford, England, a British company
No Drawing. Filed May 31, 1961, Ser. No. 113,639
Claims priority, application Great Britain June 9, 1960
8 Claims. (Cl. 260—288)

This invention is concerned with new derivatives of l-emetine and with their preparation.

l-emetine and its addition salts are used in medicine as amoebicides e.g. in the treatment of amoebic dysentery. The drug suffers, however, from the drawback that it causes serious side-effects, such as nausea, vomiting hypotension and cardiac irregularity. There exists a demand therefore, for an amoebicide having substantially the amoebicidal efficiency of l-emetine but with reduced side-effects.

We have now found that a number of N-alkyl derivatives of l-emetine as described below possess a therapeutic ratio as amoebicidal drugs, i.e. their ratio of amoebicidal activity to unwanted side-effects, more favourable than that of l-emetine.

We have carried out comparative biological tests upon a number of N-alkyl (including substituted alkyl) derivatives of l-emetine and upon l-emetine itself and have found that while many of the derivatives tested are of similar amoebicidal activity to l-emetine, the side-effects which are observed are less marked than those caused by the parent drug. Experiments show however, that whereas the N-methyl derivative of l-emetine is only slightly superior in therapeutic ratio to l-emetine itself, alkyl derivatives having longer chains gave rise to considerably reduced side effects. Thus, for example, while the cardiovascular effect of N-methyl l-emetine in guinea pigs is approximately equal to that of l-emetine, N-butyl-emetine and N-γ-hydroxybutyl produce a reduced effect, the N-butyl derivative producing the least effect on the heart. The therapeutic ratio falls off, however, with increasing the N-alkyl chain length above butyl and the N-heptyl derivative, although giving rise to reduced side-effects, shows reduced amoebicidal activity. N-hydroxyalkyl derivatives of l-emetine are also of especially favourable therapeutic ratio, notably N-γ-hydroxybutyl l-emetine.

According to the present invention we provide N-substituted derivatives of l-emetine having the general formula

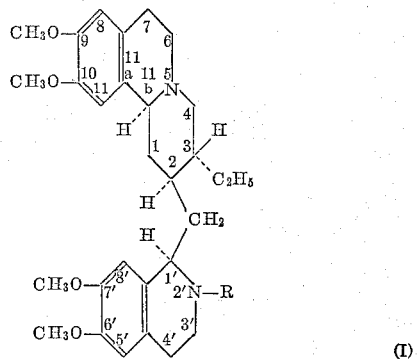

where R represents an unsubstituted alkyl, hydroxy alkyl or esterified hydroxyalkyl group having 2 to 7 carbon atoms.

The substituted or unsubstituted alkyl group R may be straight or branched chained and preferably possesses 3 to 6 carbon atoms. n-Propyl, and n-amyl groups are especially preferred and the unsubstituted n-butyl group is of special value. As indicated above N-γ-hydroxybutyl emetine is also of especial interest.

According to the invention we further provide the non-toxic acid addition salts of the tertiary bases according to the invention, the term non-toxic being used in the normal sense to refer to salts the anions of which do not confer any substantial added toxicity to the base. Examples of acid addition salts of the new bases according to the invention are the hydrochloride, hydrobromide, hydroiodide, sulphate, nitrate, tartrate, citrate etc. The invention further includes the addition complexes of the bases according to the invention with bismuth halides e.g. bismuth iodide.

The novel bases according to the invention may be prepared in any convenient way. A number of preparative methods are described below.

(1) l-emetine may be N-alkylated in one or more stages. Thus, for example, l-emetine may be condensed with an appropriate functional derivative of an aliphatic acid, e.g. a halide or anhydride, to give an amide which may then be reduced to give the desired N-alkyl compound, for example with a metal hydride reducing agent such as lithium aluminium hydride or with an alkali metal in an alkanol e.g. sodium in ethanol. Alternatively, l-emetine may be reacted with an appropriate alkylating agent such as an alkyl halide, sulphate, etc., in the presence of a base, or with a suitable aldehyde followed by reduction e.g. by catalytic hydrogenation, of the N-vinyl derivative so formed.

It is also possible to react l-emetine with a vinyl ketone to yield an N-β-acyl-ethyl derivative, the carbonyl group of which may then be reduced to yield non-oxygenated N-alkyl derivatives or N-hydroxyalkyl derivatives. The non-oxygenated compounds may be formed, for example, by reducing the carbonyl group with a metal/acid reducing system (Clemmensen reduction) or with hydrazine and alkali (Wolff-Kischner reduction) or by conversion to a thioketal derivative, e.g. by reaction with ethanedithiol, and reduction with a Raney metal, e.g. Raney iron or cobalt or, preferably, Raney nickel, or with hydrazine and alkali. The N-hydroxy alkyl derivatives may, for example, be obtained by reduction of the carbonyl group with a metal hydride reducing agent, e.g. an alkali metal or alkaline earth metal borohydride or aluminium hydride such as sodium borohydride or lithium aluminium hydride. The reaction with the vinyl ketone takes place easily at ambient temperature, conveniently in an inert solvent such as a hydrocarbon solvent e.g. benzene or toluene.

(2) An intermediate in the synthesis of l-emetine and related compounds, e.g. as described in copending U.S. patent applications Nos. 40,200 and 111,908, may be converted into an N-alkyl or N-hydroxy alkyl derivative and then reacted further to form the corresponding l-emetine derivative. Thus, for example, a compound of the general formula (where R' represents an alkyl or hydroxyalkyl group having 1–7 carbon atoms), may be reduced to convert the 3-acetyl group into a 3-ethyl group. The reduction may be effected, for example, by reaction with hydrazine and alkali (Wolff-Kischner reduction) or by conversion to a thioketal derivative, e.g. the ethylene thioketal, followed by reduction with a Raney metal, e.g. Raney iron or cobalt or, preferably, Raney nickel, or with hydrazine and alkali. It should be noted that in the reaction with hydrazine and alkali, ether groups present in the benzenoid rings may be converted to phenolic hydroxyl groups. The phenolic groups may be re-etherified however, e.g. with methylating agent such as a methyl sulphate or a phenyltrimethyl ammonium salt.

The compound of general Formula II in which R' is a 3-hydroxybutyl group may be prepared, for example by reacting a compound of the formula

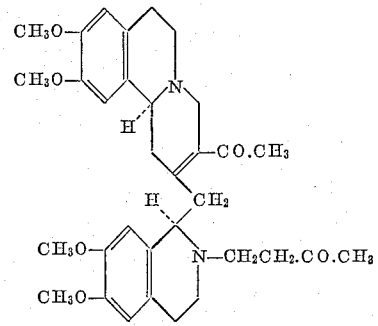

(III)

(described in U.S. patent application No. 40,200) with a metal/ammonia or metal/amine reducing system, e.g. sodium or potassium or, preferably, lithium, in liquid ammonia, to reduce simultaneously the 2(3)-double bond and the carbonyl group in the N-oxoalkyl side chain to form a compound of the formula

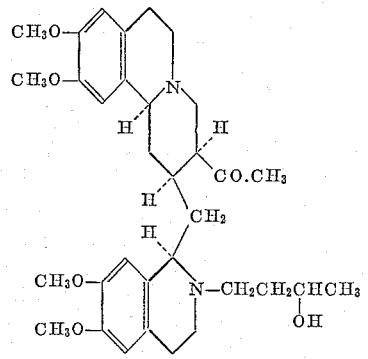

(IV)

often in admixture with the 3α-acyl isomer of general formula

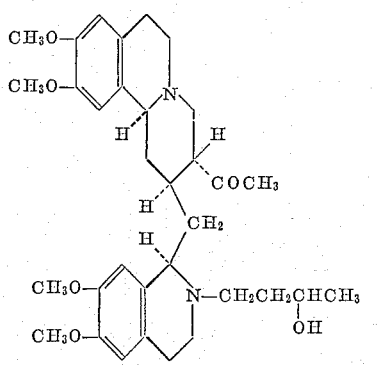

(V)

Isomerisation of compound IV to compound V is generally required in order to form the desired l-emetine derivatives and thus may be effected under strong enolising conditions, for example in the presence of concentrated aqueous acid e.g. aqueous mineral acid such as hydrochloric, sulphuric or phosphoric acid or alkali e.g. an alkali metal hydroxide such as sodium or potassium hydroxide or strong organic base, e.g. triethylamine. This conversion may however take place spontaneously in a subsequent reduction step if the reduction conditions are sufficiently basic or acidic and no separate isomerisation will then be required.

Alternatively, an intermediate as described in copending U.S. patent application No. 111,908 of the general formula:

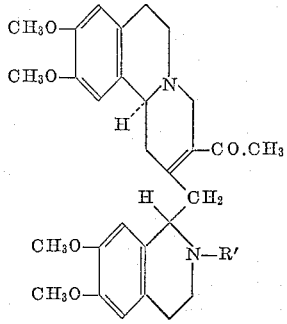

(VI)

(where R' has the above meaning) may be reacted with a metal ammonia or metal/amine reducing system, e.g. sodium, potassium or, preferably, lithium in liquid ammonia to reduce the 2(3)-double bond. Isomerisation at the 3-position then yields the desired compound of general Formula II.

In the methods employing intermediate compounds rather than emetine, it is preferred to carry out the reactions on the appropriate optical isomer of the intermediate although resolution, where required, may be carried out at other stages. Where emetine is used as starting material this may be either l-emetine or the racemate, resolution in the latter case being effected at a later stage.

Where esterified N-hydroxyalkyl compounds according to the invention are required these may be obtained, for example, by reaction of the corresponding N-hydroxyalkyl derivative with an esterifying agent such as a halide or anhydride of the desired acid.

In order that the present invention may be well understood we give the following examples by way of illustration only:

EXAMPLE 1

(a) N-n-Butyryl Emetine

Emetine hydrochloride (4.16 g.) in water (40 ml.) was stirred with ether (40 ml.) and 2 N-sodium hydroxide added until the lower phase was alkaline. The organic phase was separated and aqueous phase extracted again with ether (20 ml.). The combined ethereal solution was added to 2 N-sodium hydroxide (80 ml.) and the whole cooled to 10°. n-Butyric anhydride (10 ml., 10 mols.) was then added, the mixture shaken vigorously for a few minutes, and then stirred at room temperature for ¾ hr. The ethereal layer was separated, washed with 2 N-sodium hydroxide (25 ml.), and the basic material was extracted with 2 N-hydrochloric acid (50 ml., 2 x 25 ml.). The extract was made alkaline and the yellow oil was isolated with ethyl acetate (4 x 40 ml.), affording N-n-butyryl emetine as a pale yellow foam (3.55 g.).

The base was dissolved in ethanolic hydrogen chloride (14 ml., 4 N) and precipitated slowly by addition of dry ether (25 ml.) at room temperature with stirring. Crystallisation slowly occurred and after 1 hr. the temperature was gradually reduced to 15° and the mixture was then left at 5° overnight. The resulting solid was recrystallised from dry ethanol (25 ml.) and dry ether (225 ml.) at room temperature, affording the hydrochloride as colourless plates (3.17 g., 82%), M.P. 188–192° (decomp.) $[\alpha]_D^{22}$ —31.9° (c.=1% in water). (Found: C, 66.1;

H, 8.4; N, 4.65; Cl, 5.75. $C_{33}H_{46}O_5N_2.HCl.C_2H_5OH$ requires C, 66.4; H, 8.4; N, 4.6; Cl, 5.6%.)

(b) *N-n-Butylemetine*

N-n-butyrylemetine was regenerated from the pure hydrochloride (10.0 g.) by means of aqueous ammonia and ether. The dry base (7.8 g.) in dry ether-tetrahydrofuran (80 ml., 2:1) was added dropwise to a stirred slurry of lithium aluminium hydride (3.2 g., 10 mols.) in ether-tetrahydrofuran (300 ml., 2:1) over ½ hr. and the mixture was then heated under reflux for 5 hrs. After cooling, the excess of lithium aluminium hydride was decomposed with ethanol and lithium and aluminium complexes were dissolved by addition of 2 N-sodium hydroxide (500 ml.). The organic phase was separated and the aqueous layer extracted with ether (3 x 200 ml.). The combined organic phase was dried (MgSO$_4$) and the solvent removed in vacuo, leaving a pale yellow froth which was dissolved in N-hydrochloric acid (50 ml.). N-n-butyl emetine hydrochloride slowly separated as fine needles (two crops, 6.2 g., 72%), M.P. 188–192°. The salt had unchanged melting point after crystallisation from water, $[\alpha]_D^{23}+19.7°$ (c.=1% in water). (Found: C, 56.4; H, 8.6; N, 3.7; Cl, 10.0. $C_{33}H_{48}N_2O_4.2HCl.5H_2O$ requires C, 56.6; H, 8.6; N, 4.0; Cl, 10.2%.) The salt gave a reproducible loss in weight of 12.5% on drying at room temperature in vacuo (P$_2$O$_5$), after equilibration in air (pentahydrate requires 12.8% loss in weight). The hydrobromide separated from water in prismatic needles, sintering at 205–207°, melting finally at 240° (decomp.), $[\alpha]_D^{23}+17.8°$ (c.=1% in water). (Found: C, 50.1; H, 7.6; N, 3.7; Br, 20.3. $C_{33}H_{48}O_4N_2.2HBr.5H_2O$ requires C, 50.3; H, 7.7; N, 3.6; Br, 20.3%.) This salt gave a reproducible loss in weight of 10.9% when dried as described for the hydrochloride (pentahydrate requires 11.4% loss in weight).

EXAMPLE 2

(a) *N-n Heptoylemetine*

A mixture of an ethereal solution of emetine (120 ml.) prepared from the hydrochloride (8.3 g.) as described for the butyrylation in Example 1, and 2 N-sodium hydroxide (160 ml.) was cooled to 10°, heptanoic anhydride (15 ml., 10 mols.) was added, the mixture was vigorously shaken and then stirred at room temperature for ¾ hr. The ether layer was separated and washed with 2 N-sodium hydroxide (50 ml.). Basic material was then extracted with 2 N-hydrochloric acid (2 x 100 ml., 2 x 50 ml.), at which stage a considerable quantity of gum separated. This was washed further with a little ether and combined with the acid extract, the whole then being neutralised with dilute ammonia solution and the resulting oil was isolated by extraction with ethyl acetate (5 x 100 ml.). Removal of the solvent in vacuo afforded a yellow froth (6.85 g.) which was insoluble in dilute mineral acids. This material darkened on keeping, but the colour could be removed by percolation through alumina in benzene and ethyl acetate (9.1), without any change in I.R. light absorption. The common salts of this base could not be obtained crystalline, but an oxalate was formed in acetone, this sintered at 106–110°, finally melting at 143–155° (decomp.).

(b) *N-n-Heptylemetine*

N-n-heptoylemetine (2.4 g., freshly purified by chromatography) in dry ether-tetrahydrofuran (20 ml., 1:1) was added dropwise to a stirred slurry of lithium aluminium hydride (1.0 g.) and ether-tetrahydrofuran (75 ml., 2:1) under nitrogen. The mixture was heated under reflux for 8 hrs. and kept under nitrogen overnight. Excess reagent was decomposed with ethanol, and 2 N-sodium hydroxide (300 ml.) was added continuously. The organic layer was separated, and the aqueous phase further extracted with ether (3 x 50 ml.). The combined organic phase was dried (MgSO$_4$) and the solvent removed in vacuo, leaving a brown gum (2.2 g.) which was dissolved in benzene and ethyl acetate (50 ml., 9:1) and percolated through alumina (20 g.). Elution with the same solvent (250 ml.) afforded N-n-heptylemetine as a pale yellow froth (1.85 g.). The base was soluble in dilute sulphuric acid, but insoluble in other mineral acids. Neither the hydrochloride, hydrobromide, sulphate, oxalate or perchlorate could be obtained crystalline. Treatment with picric acid in ethanol gave an amorphous picrate, sintering at 108–110° with final melting at 120°. An amorphous hydriodide was formed by addition of aqueous potassium iodide to a solution of the base in dilute sulphuric acid. This separated from water as a yellow powder, sintering at 165–170° with final melting at 180–185°.

The picrolonate prepared in ethanol, separated slowly from the same solvent as microcrystals, M.P. 146–150° (decomp.). (Found: C, 58.2; H, 6.3; N, 13.0.

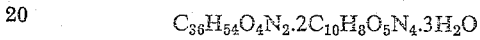

$C_{36}H_{54}O_4N_2.2C_{10}H_8O_5N_4.3H_2O$ requires C, 58.0; H, 6.0; N, 12.0%.)

The chloroplatinate was obtained as a buff amorphous solid, M.P. 204–210° (decomp.).

EXAMPLE 3

(−)*N-γ-Oxobutyl Emetine*

(−)Emetine hydrochloride (B.P.) (9 g.) was dissolved in water (180 ml.) in the presence of benzene (90 ml.) and basified with saturated aqueous sodium carbonate to pH 10. The layers were separated and the aqueous phase re-extracted with benzene (2 x 45 ml.). The first two extracts were combined and washed with water (3 x 50 ml.), the washes being back-extracted with the third benzene extract. The combined organic layers were dried (MgSO$_4$), methyl vinyl ketone (3.6 ml.) added and the solution allowed to stand overnight at room temperature. The solvent was removed by evaporation at room temperature in vacuo and the residue re-evaporated twice with ether. The pale froth was then dissolved in water (800 ml.) by the addition of the minimum quantity of 2 N hydrochloric acid. The solution was then basified to pH 10 by stirring with aqueous sodium carbonate solution. The white amorphous precipitate was washed well with water and dried at room temperature in vacuo. Wt.=7.19 g. M.P. 66–70° C. with previous softening. $[\alpha]_D^{21}-45°$ (c.=1; CHCl$_3$).

The free base was dissolved in a small volume of ethanol and ethanolic hydrogen chloride was then added to pH 1. Ether was added dropwise till a faint permanent opalescence was obtained. Scratching and cooling in the refrigerator gave the hydrochloride as a white amorphous solid. Wt.=7.2 g. Double melt 217–220° C. and 245–255° C. (d.). (Found: C, 59.64; H, 8.07; N, 4.14; Cl, 10.20. $C_{33}H_{48}O_5N_2Cl_2.2H_2O$ requires C, 60.64; H, 7.99; N, 4.19; Cl, 10.75%.)

(−)*N-γ-Hydroxylbutyl Emetine*

N-γ-oxobutyl emetine (2 g.) was dissolved in anhydrous methanol (40 ml.) and a solution of sodium borohydride (0.81 g.) in water (8 ml.) added with cooling. After being allowed to stand at room temperature for 3 hours, when the evolution of gas had ceased, the mixture was acidified with 2 N hydrochloric acid and the bulk of the methanol removed by evaporation at room temperature in vacuo. The solution was diluted with water and basified to pH 10 with aqueous sodium carbonate. A fine white precipitate was obtained, which was filtered off, washed with water, and dried at room temperature in vacuo to a white amorphous solid. Wt.=1.97 g. M.P. 79–82° C. with previous softening. $[\alpha]_D^{21}-37°$ (c.=1; CHCl$_3$).

The hydrochloride was made as above from the base (0.8 g.) to give a white amorphous powder (0.9 g.) M.P. 190–6° C. (resinous melt). (Found: C, 58.56; H, 8.44; N, 3.92; C, 10.37. $C_{33}H_{50}O_5N_2Cl_2 \cdot 3H_2O$ requires C, 58.31; H, 8.31; N, 4.12; Cl, 10.43%.)

EXAMPLE 4

Hydrazone of Compound II (R'=Hydroxybutyl)

To a stirred solution of potassium hydroxide (2 g.) in diethylene glycol (10 ml.) was added hydrazine (95%; 2 ml.) and the ethylene thioketal of compound II (R'=hydroxybutyl) (1.0 g.), and the mixture was heated at 135–140° C. (internal temperature). Aliquots, removed at 10 minute intervals and chromatographically examined, showed that thioketal of compound II (R'=hydroxybutyl) had almost disappeared after 10 min. After 1 hr. the aliquots removed after 10 min. were combined, diluted with water (150 ml.) and extracted with benzene (4 x 50 ml.). The extracts were washed with water (2 x 50 ml.) which was back-washed with benzene (30 ml.). The combined benzene extracts were dried ($MgSO_4$) and evaporated in vacuo to yield the desired hydrazone as a pale froth (0.55 g.). (Found: N, 8.49; S, 0.31. $C_{33}H_{48}O_5N_4$ requires N, 8.75; S, 0.00%.)

The hydrazone (0.42 g.) was converted into the hydrogen oxalate in ethanol solution and precipitated with ether as a white amorphous solid (0.53 g.), M.P. 180–200° (decomp.) with evolution of gas at 160–165°. (Found. C, 53.62; H, 6.63; N, 5.85.

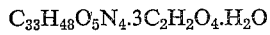

requires C, 53.91; H, 6.50; N, 6.45%.)

Hydrolysis of the hydrazone (100 mg.) with 5 N-sulphuric acid (6 ml.) at 100° C. for 1 hr. afforded the ketone II (R'=hydroxybutyl) which was identical with the ketone obtained by acid hydrolysis of the thioketal.

EXAMPLE 5

(±)N-3-Hydroxybutylemetine (I, R=Hydroxybutyl)

To a stirred solution of potassium hydroxide (10 g.) in purified diethylene glycol (25 ml.) under a dry nitrogen atmosphere was added anhydrous hydrazine (10 ml.), and a solution of the thioketal of compound II (R'=hydroxybutyl) (5 g.) in diethylene glycol (25 ml.). The mixture was heated at 140° C. for 15 min., and the internal temperature was then raised to 170° C. during the next 30 min., and maintained thereat for a further 5 hrs. When cool, water (1 l.) was added, and the solution was adjusted to pH 8.0 with concentrated hydrochloric acid, and the product was extracted with chloroform (6 x 80 ml.). Each extract was back-washed with water (20 ml.), which was then added to the main alkaline solution. The combined chloroform extracts were dried ($MgSO_4$) and evaporated in vacuo to yield a yellow froth (3.64 g.) which consisted of mainly phenolic material.

A stirred suspension of this product (3.58 g.) in xylene (50 ml.) at 80° was treated with 25% methanolic potassium hydroxide solution (9.2 ml.) and trimethyl phenylammonium chloride (4.7 g.). The temperature was raised to 125° C. as quickly as possible by distillation of the methanol (15 min.), and then maintained at 125° C. for 30 min. When cool the products were extracted into 2 N-hydrochloric acid (40 ml.) and water (3 x 20 ml.), and the combined extracts were washed with ether (2 x 20 ml.), and adjusted to pH 6.2 with 2 N-sodium hydroxide. Extraction with ether (3 x 20 ml.) removed all the dimethylaniline, and the acidic layer, rendered strongly alkaline with 2 N-sodium hydroxide, was washed with ether (4 x 50 ml.). The ethereal extracts were washed with water (2 x 30 ml.), dried ($MgSO_4$), and evaporated in vacuo to yield (±) N-3-hydroxybutylemetine (2.14 g.; 50.6% of theory), whose infrared spectrum in solution was identical with that of (−)-N-3-hydroxybutylemetine.

EXAMPLE 6

Preparation of (−) N-n-Butylemetine (a) DESULPHURISATION OF THE ETHYLENE THIOKETAL OF N-(3-OXO-n-BUTYL) EMETINE Preparation of the thioketal.—(−)N-(3-oxo-n-butyl) emetine (6 g.), in dry methanol (40 ml.) saturated with anhydrous hydrogen chloride, was treated with ethane-1,2-dithiol (4 ml.) and the solution allowed to stand overnight at room temperature. The solvent was removed in vacuo at room temperature and the residual gum dissolved in water. Aqueous sodium carbonate solution was added to pH 10 and the mixture was then extracted with benzene (2 x 50 ml.). The organic extracts were washed with 2 N-sodium hydroxide solution and water, before being dried ($MgSO_4$) and evaporated to dryness to give the thioketal as a pale foam.

The hydrochloride (6 g.) separated from ethanol-ether as a white solid, M.P. 229–233° C. (decomp.). (Found: C, 55.9; H, 8.0; Cl, 9.7; N, 3.9; S, 8.7.

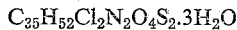

requires C, 55.9; H, 7.8; Cl, 9.4; N, 3.8; S, 8.5%.)

Desulphurisation.—(1) The thioketal (0.55 g), hydrazine hydrate (5 ml.), and potassium hydroxide (5 g.) were heated under reflux in redistilled Cellosolve (15 ml.) for 5 hrs. in an atmosphere of nitrogen. The solvent was removed in vacuo, the residue diluted with water and the basic material extracted with benzene (3 x 25 ml.). Removal of the solvent, after washing and drying, gave (−)N-n-butylemetine (0.23 g., 47%) as a pale foam.

The hydrochloride had M.P. 188–192° C. (resinous melt) and was identical with the previously described specimen.

(2) The thioketal (0.53 g.) in ethanol (20 ml.) was stirred at 60° C. for 24 hrs. with fresh W–4 Raney nickel catalyst (3 ml. slurry) in an atmosphere of hydrogen. Removal of the catalyst and evaporation of the solvent gave chromatographically pure (−)N-n-butylemetine (0.22 g., 49%) which was converted into the hydrochloride (0.1 g), M.P. 186–192° C. (resinous melt) identical with previous specimens.

(b) DESULPHURISATION OF THE BENZYLMERCAPTOL OF N-(3-OXO-n-BUTYL) EMETINE (−)N-(3-oxo-n-butyl) emetine (2 g.) in dry methanol (20 ml.) saturated with anhydrous hydrogen chloride, was treated with benzyl mercaptan (1 ml.) and the solution allowed to stand at room temperature for 2 hrs. The reaction mixture was worked up as described above for the ethylene thioketal when the benzyl mercaptol (2.9 g.) was obtained as a pale froth.

The mercaptol (0.5 g.), in ethanol (30 ml.), was shaken with W–4 Raney nickel (3 ml. slurry) under hydrogen at 55° C. and atmospheric pressure for 24 hrs. Removal of the catalyst and evaporation to dryness gave (−)N-n-butylemetine (0.18 g., 53% as a white froth, identical with previous specimens, and characterised as the hydrochloride (62 mg.).

(c) WOLFF-KISCHNER REACTION ON (−)N-(3-OXO-n-BUTYL) EMETINE (−)N-(3-oxo-n-butyl) emetine (4 g.) was heated under nitrogen for 4 hrs. at 145–150° C. with hydrazine hydrate (4 ml.), and sodium hydroxide (4.8 g.) in diethylene glycol (40 ml.). The mixture was cooled, diluted with water (500 ml.) and the pale yellow solid filtered off and washed with water. The precipitate was taken up in water containing a little 2 N-hydrochloric acid and activated charcoal (0.5 g.) added. After 4 hrs. the charcoal was removed and the solution neutralised with aqueous sodium carbonate solution. The amorphous white precipitate was filtered off, washed with water and dried at room temperature. Wt.=1.6 g. Paper chromatography showed this to be a mixture of (−)emetine and (−)N-n-butyl-emetine.

The crude base (1.25 g.) was dissolved in water containing a little 2 N-hydrochloride acid and an excess of ammonium bromide added. The initial oily precipitate became a white crystalline solid on being allowed to stand, with scratching, for 24 hrs. This was collected, dried, and recrystallised from methanol to give (+) emetine hydrobromide (0.43 g.).

Addition of ether to the methanolic mother-liquor gave a fine precipitate which was filtered off, dissolved in water and basified with aqueous sodium carbonate solution. The white amorphous precipitate was collected, washed with water, and dried in vacuo at room temperature. The pale solid (0.24 g.), M.P. 63–66° C., with previous softening, had an $R_F$ value and infrared spectrum identical with those of previous specimens of (−)N-n-butylemetine.

EXAMPLE 7

*3-Acetyl-1,2,3,4,6,7-Hexahydro-9,10-Dimethoxy - 2(1,2,3, 4-Tetrahydro-2(3′-Hydroxybutyl)-6,7-Dimethoxy - Isoquinol-1-yl)Methyl-11b[H]-Benzo[α]Quinolizone (V)*

(a) 3-acetyl-1,4,6,7-tetrahydro-9,10-dimethoxy - 2(1,2, 3,4-tetrahydro-2(3′-oxobutyl)-6,7-dimethoxy - isoquinol-1-yl)methyl-11b[H]-benzo[α]quinolizine (III) (10 g.) in anhydrous tetrahydrofuran (150 ml.) was added to a solution of lithium (1.2 g.) in liquid ammonia (500 ml.) and the mixture stirred for 30 minutes at reflux temperature. The blue colour was discharged by the addition of acetone (ca. 11 ml.) followed by ammonium chloride (10 g.). Evaporation, at first at atmospheric pressure to remove the ammonia, and then in vacuo to eliminate organic solvent, gave a pale foam. Water (100 ml.) and chloroform (40 ml.) were added. The layers were separated and the aqueous phase extracted with chloroform (4 x 40 ml.). The first four extracts were combined and washed with water (3 x 100 ml.), the washes being back-extracted with the fifth extract. Removal of the solvent in vacuo gave a pale foam.

The latter was heated at 100° C. with 5 N-sulphuric acid for 30 minutes to effect equilibration. The solution was cooled, diluted with water containing crushed ice, benzene (100 ml.) added, and the mixture basified by the addition of potassium carbonate. Isolation of the reaction product in benzene solution (ca. 200 ml.) was accomplished by an extraction and washing technique similar to that described in the preceding paragraph. Removal of the solvent gave a pale froth (9.56 g.) containing the desired product.

(b) *Purification via the ethylene thioketal.*—The total crude product formed in (a) above was taken up in anhydrous methanol (200 ml.) and the solution saturated at 0° C. with anhydrous hydrogen chloride. Ethane dithiol (3 ml.) was added and the mixture allowed to stand for 2 hours. Removal of the solvent by evaporation in vacuo gave a pale gum, which was taken up in water and basified with 2 N-sodium hydroxide. Extraction with benzene (4 x 50 ml.) and washing with 2 N-sodium hydroxide (2 x 50 ml.) and water (5 x 50 ml.) was carried out as above. The crude ethylene thioketal was obtained as a pink froth (8.6 g.) by evaporation of the solvent.

This material was placed on a column of alumina (grade H) (300 g.) in benzene and eluted successively with benzene (1.5 l.), 5% ethyl acetate-benzene (1 l.) 10% ethyl acetate-benzene (2 l.), 20% ethyl acetate-benzene (6 l.), 30% ethyl acetate-benzene (1 l.) and 40% ethyl acetate-benzene (1 l.). The last three eluants gave rise to a total of 3.0 g. of the desired thioketal, which paper chromatography showed to be substantially homogeneous.

The hydriodide of this material crystallised from ether-ethanol, M.P. 207–209° C. (d.). (Found: C, 44.13; H, 5.93; N, 2.70; S, 6.40; I, 27.04.

requires C, 44.12; H, 6.14; N, 2.94; S, 6.73; I, 26.64%.)

EXAMPLE 8

(±)*N-(3-Hydroxybutyl)emetine*

The ethylene thioketal formed in Example 7(b) (0.873 g.) in dry I.M.S. (50 ml.) was shaken under hydrogen (50 atmospheres pressure) with Raney nickel catalyst (W–4: 7 ml. slurry) for 3 hours at 75–80° C. and then for a further 7 hours while the autoclave cooled to room temperature.

The catalyst was filtered off, washed with ethanol and the combined filtrate and washings evaporated in vacuo to a pale gum. Addition of ether and re-evaporation yielded a white froth (351 mg.) whose $R_F$ value and I.R. spectrum were similar to those of (−)N-(3-hydroxybutyl)emetine made from the natural alkaloid.

The hydrochloride separated from ethanol on the addition of ether as a white amorphous solid M.P. ca. 212° C. (d.) with previous sintering. (Found: C, 58.52; H, 8.24; N, 3.87; Cl, 10.04. $C_{33}H_{48}O_5N_2.2HCl.3H_2O$ requires C, 58.31; H, 8.31; N, 4.12; Cl, 10.43%.)

EXAMPLE 9

3 - acetyl - 1,4,6,7 - tetrahydro - 9,10 - dimethoxy - 2-(1,2,3,4 - tetrahydro - 2(3′ - oxobutyl) - 6,7 - dimethoxy-isoquinol - 1 - yl)methyl - 11b[H] - benzo[α]quinolizine (III) (5 g.) was reduced as above with lithium in liquid ammonia. The crude product, isolated as before, was taken up in anhydrous methanol (50 ml.) and saturated with anhydrous hydrogen chloride without cooling. The heat of solution caused the mixture to boil. The solution was cooled to 0°, ethane dithiol (3 ml.) added, and the crude ethylene thioketal obtained as before.

The crude foam (5.42 g.) in benzene was absorbed on a column of silica gel (160 g.) and eluted successively with dry benzene (500 ml.), 50% ethyl acetate-benzene (850 ml.), and ethyl acetate (1.5 l.).

The ethyl acetate fraction gave the desired ethylene thioketal (2.83 g.), homogeneous on a paper chromatogram or silica chromatostrip.

EXAMPLE 10

(a) *3 - Acetyl - 2(2 - N - Butyl - 1,2,3,4 - Tetrahydro - 6,7-Dimethoxy - Isoquinol - 1 - yl) Methyl - 1,2,3,4,6,7-Tetrahydro-9,10-Dimethoxy-Benzo-[α]-Quinolizine (II; R′=Butyl)*

3 - acetyl - 2(2 - N - butyl - 1,2,3,4 - tetrahydro - 6,7-dimethoxy - isoquinol - 1 - yl)methyl - 1,4,6,7 - tetrahydro-9,10-dimethoxy-benzo-[α]-quinolizine (VI) (R′=butyl) (5 g.) in dry benzene (50 ml.) and dry ether (50 ml.) was added with vigorous stirring over a period of 5 minutes to a refluxing solution of lithium (0.6 g.) in liquid ammonia (500 ml.) (dried and distilled from sodium) containing dry ether (100 ml.). After 30 minutes acetone was added to destroy the excess of the lithium and the ammonia was removed by evaporation. Water (200 ml.) was added, the aqueous phase separated from the organic layer and extracted with benzene (2 x 50 ml.). The combined organic layers were washed with water (3 x 100 ml.), dried ($MgSO_4$), and the solvent removed by evaporation in vacuo to a pale brittle foam. This was taken up in 6 N-sulphuric acid (40 ml.) and heated at 100° C. for 1 hr. The solution was cooled, excess ammonia (S.G. 0.88) added, and the mixture extracted with benzene (3 x 50 ml.). The organic extracts were washed, dried, and evaporated as above to give the crude saturated ketone (II; R′=butyl) as a brownish foam. Wt.=4.69 g.

(b) *Formation of the Ethylene Thioketal of II (R′=Butyl)*

The crude ketone (II; R′=butyl) was allowed to stand for 18 hrs. at room temperature in anhydrous methanol (55 ml.), saturated with anhydrous hydrogen chloride, and containing ethane-1,2-dithiol (1.1 ml.). The solvent was removed by evaporation at room temperature in vacuo, the residue dissolved in chloroform (50 ml.), and the excess acid neutralised by the addition of 2 N-sodium hydroxide. The aqueous phase was extracted with further quantities of chloroform (2 x 25 ml.), and the combined organic extracts washed with water, dried, and evaporated as above to give the crude thioketal as a brown froth (5.16 g.). This was absorbed on a column of silica (150 g.) in benzene and eluted successively with benzene (500 ml.), 10%-ethyl acetate-benzene (500 ml.), and 50% ethyl acetate-benzene (1400 ml.). The last eluant, after evaporation, gave the desired thioketal (1.92 g.) of the title ketone as an amorphous foam that was homogeneous on a thin-layer chromatogram.

(c) (±)N-n-Butylemetine

The above thioketal (1.5 g.) in tetrahydrofuran (5 ml.) and ethanol (40 ml.) was heated and stirred at 58° and atmospheric pressure for 24 hrs. in the presence of W-7 Raney nickel catalyst (15 ml. slurry). A second portion (5 ml.) of catalyst was added and the reaction continued for a further hour. The catalyst was removed by filtration and the filtrate evaporated to give crude (±)N-n-butylemetine as a pale foam (0.48 g.).

The hydrochloride (0.148 g.) separated from 2 N-hydrochloric acid (2 ml.) as a pale solid, M.P. 231–234° C. (d.). This had a similar infrared spectrum and the same $R_F$ value on a paper chromatogram or on a thin-layer chromatogram as (+)N-n-butylemetine hydrochloride made from (−)emetine.

EXAMPLE 11

Hydroxy butyl emetine (0.384 g.) in methylene chloride (10 ml.) was heated at reflux for 13 minutes with acetic anhydride (1 ml.) and perchloric acid (60% w./v.; 0.5 ml.). The solution was cooled, poured into crushed ice and 2 N-sodium carbonate solution and the layers separated. Extraction of aqueous phase with chloroform and evaporation of the combined methylene chloride/chloroform extract, gave the acetate as a pale foam.

We claim:

1. A process for the preparation of a compound of the formula

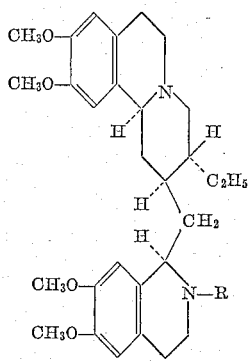

where R is a member selected from the group consisting of alkyl of 1–7 carbon atoms and hydroxyalkyl group of 1–7 carbon atoms, comprising reacting a corresponding compound having a group —C(=R')—CH₃ in the 3-position, where R' represents a substituent selected from the group consisting of an oxygen atom and a thioketal group with a reducing agent selected from the group consisting of molecular hydrogen in the presence of Raney nickel and hydrazine with alkali, said reaction being with hydrazine and alkali when R' is oxygen.

2. A process as claimed in claim 1 in which the group —C(=R')—CH₃ is acetyl and the reduction is effected by reaction with hydrazine and alkali.

3. A process as claimed in claim 1 in which R' is a thioketal group and the reduction is effected by reaction with hydrazine and alkali.

4. A process as claimed in claim 1 in which R' is a thioketal group and the reduction is effected by reaction with molecular hydrogen in the presence of Raney nickel.

5. A process as claimed in claim 1 for producing N-γ-hydroxybutyl-1-emetine in which the starting compound is produced by reducing 3-acetyl-1,4,6,7-tetrahydro-2(3'-oxobutyl)-6,7-dimethoxy-isoquinol-1-yl) methyl-11b[H]-benzo[α]quinolizine with an agent comprising an alkali metal dissolved in liquid ammonia to saturate the 2(3)-double bond and to reduce the oxobutyl side chain to a hydroxybutyl group and isomerising the 3β-acetyl compound so produced with an agent selected from the group consisting of hydrochloric acid, sulphuric acid, phosphoric acid, sodium hydroxide, potassium hydroxide and triethylamine to yield the 3α-acetyl isomer.

6. A process as claimed in claim 5 in which the reduction is effected with lithium in liquid ammonia.

7. A process as claimed in claim 1 for the preparation of N-substituted derivatives of 1-emetine in which the starting compound is produced by reducing a compound of the formula

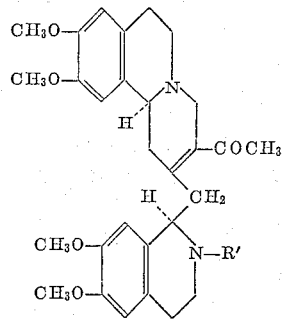

where R' is a member selected from the group consisting of an alkyl group of 1 to 7 carbons and a hydroxyalkyl group of 1 to 7 carbons with an agent comprising an alkali metal dissolved in liquid ammonia to saturate the 2(3)-double bond and isomerising the 3β-acetyl compound so produced with an agent selected from the group consisting of hydrochloric acid, sulphuric acid, phosphonic acid, sodium hydroxide, potassium hydroxide and triethylamine to yield the 3α-acetyl isomer.

8. A process as claimed in claim 7 in which the reduction is effected with lithium in liquid ammonia.

References Cited in the file of this patent

UNITED STATES PATENTS 2,877,227     Cohen et al. _____ Mar. 10, 1958

OTHER REFERENCES

Auterhoff et al.: Chem. Abstracts, vol. 54, col. 5726 (1960), abstract of Archiv Pharm., vol. 291, pp. 555–66 (1958).

Brossi et al.: Helv. Chim. Acta., vol. 42, pp. 772–88 (1959).

Lasslo et al.: J. American Pharmaceutical Association, vol. 39, pp. 43–46 (1950).